(12) United States Patent
Zhao (10) Patent No.: US 11,700,189 B2
(45) Date of Patent: Jul. 11, 2023

(54) METHOD FOR PERFORMING TASK PROCESSING ON COMMON SERVICE ENTITY, COMMON SERVICE ENTITY, APPARATUS AND MEDIUM FOR TASK PROCESSING

(71) Applicant: BOE TECHNOLOGY GROUP CO., LTD., Beijing (CN)

(72) Inventor: Junjie Zhao, Beijing (CN)

(73) Assignee: BOE TECHNOLOGY GROUP CO., LTD., Beijing (CN)

( * ) Notice: Subject to any disclaimer, the term of this patent is extended or adjusted under 35 U.S.C. 154(b) by 59 days.

(21) Appl. No.: 17/272,539

(22) PCT Filed: Jun. 26, 2019

(86) PCT No.: PCT/CN2019/093084
§ 371 (c)(1),
(2) Date: Mar. 1, 2021

(87) PCT Pub. No.: WO2020/048194
PCT Pub. Date: Mar. 12, 2020

(65) Prior Publication Data
US 2021/0328887 A1    Oct. 21, 2021

(30) Foreign Application Priority Data

Sep. 4, 2018    (CN) .......................... 201811022263.7

(51) Int. Cl.
*H04L 41/50*    (2022.01)
*H04L 41/5019*    (2022.01)
(Continued)

(52) U.S. Cl.
CPC ...... *H04L 41/5058* (2013.01); *H04L 41/5019* (2013.01); *H04L 41/5051* (2013.01); *H04L 67/51* (2022.05); *H04L 67/63* (2022.05)

(58) Field of Classification Search
CPC ............ H04L 41/5058; H04L 41/5019; H04L 41/5051; H04L 67/51; H04L 67/63;
(Continued)

(56) References Cited

U.S. PATENT DOCUMENTS 10,206,090 B2 * 2/2019 Cho .................... G06F 16/9535
10,834,559 B2    11/2020 Wu
(Continued)

FOREIGN PATENT DOCUMENTS

CN    101009640 A  *   8/2007    ............. H04L 12/66
CN    101009640 A       8/2007
(Continued)

OTHER PUBLICATIONS

International Search Report in PCT/CN2019/093084 dated Sep. 16, 2019 in Chinese with English translation.
(Continued)

*Primary Examiner* — Sm A Rahman
(74) *Attorney, Agent, or Firm* — Collard & Roe, P.C.

(57) ABSTRACT

Provided are a method for performing task processing on a common service entity, a common service entity, an apparatus and a medium for performing task processing. The method includes: receiving a task processing request; determining whether the common service entity itself performs the processing request; forwarding the request to another common service entity in a case where it is determined that the common service entity itself does not perform the task processing request, wherein the common service entity is associated with the another common service entity; performing, by the common service entity, the task processing request in a case where it is determined that the common service entity itself performs the task processing request.

19 Claims, 4 Drawing Sheets

(51) Int. Cl.
  *H04L 41/5051* (2022.01)
  *H04L 67/51* (2022.01)
  *H04L 67/63* (2022.01)

(58) Field of Classification Search
  CPC ..... H04L 41/5022; H04L 67/12; H04L 12/08; H04L 63/0876; H04L 67/60
  See application file for complete search history.

(56) References Cited

U.S. PATENT DOCUMENTS

2008/0120240 A1* 5/2008 Ginter ................. G06Q 20/085
  705/51
2019/0320304 A1* 10/2019 Wu ........................ H04L 67/10

FOREIGN PATENT DOCUMENTS

| | | |
|---|---|---|
| CN | 103023935 A | 4/2013 |
| CN | 103516744 A | 1/2014 |
| CN | 105516271 A | 4/2016 |
| CN | 107567006 A | 1/2018 |
| CN | 108075908 A | 5/2018 |
| EP | 2760250 A | 8/2018 |
| EP | 3 541 013 A1 | 9/2019 |
| WO | 2015/096012 A1 | 7/2015 |
| WO | 2015/106382 A1 | 7/2015 |

OTHER PUBLICATIONS

Chinese Office Action in Chinese Application No. 201811022263.7 dated Feb. 25, 2022 with English translation.

* cited by examiner

METHOD FOR PERFORMING TASK PROCESSING ON COMMON SERVICE ENTITY, COMMON SERVICE ENTITY, APPARATUS AND MEDIUM FOR TASK PROCESSING

CROSS REFERENCE TO RELATED APPLICATIONS

This application is the National Stage of PCT/CN2019/093084 filed on Jun. 26, 2019, which claims priority under 35 U.S.C. § 119 of Chinese Application No. 201811022263.7 filed on Sep. 4, 2018, the disclosure of which is incorporated by reference.

TECHNICAL FIELD

The present disclosure relates to the field of Internet of Things, and more particularly to a method for performing task processing on a common service entity, a common service entity, an apparatus and a medium for performing task processing.

BACKGROUND

With the development of information technology, especially Internet technology, the Internet of Things (IoT) technology for informationization, remote management control and intelligentization has gradually matured. The IoT uses local network or Internet and other communication technologies to connect sensors, controllers, machines, people, and objects in a new way to form a connection among people and things, and a connection among things and things. With the rapid developments of the IoT technology in various application fields, more and more devices are connected to the IoT. Among the associated entities in the IoT, there is a need to cooperate with each other to realize task processing. For example, the task processing may be certification, notification, update, deletion, etc. so as to realize the certification, scheduling, security management and other functions among entities in the IoT.

SUMMARY

According to one aspect of the present disclosure, there is provided a method for performing task processing on a common service entity, comprising: receiving a task processing request; determining whether the common service entity itself performs the task processing request; forwarding the request to another common service entity in a case where it is determined that the common service entity itself does not perform the task processing request, wherein the common service entity is associated with said another common service entity; performing, by the common service entity, the task processing request in a case where it is determined that the common service entity itself performs the task processing request.

According to embodiments of the present disclosure, a first resource list is stored in the common service entity, and the first resource list contains information of all common service entities associated with the common service entity.

According to embodiments of the present disclosure, the common service entity determines whether other common service entities in the first resource list meet the first criterion, and removes a common service entity which does not meet the first criterion from the first resource list, so as to update the first resource list.

According to embodiments of the present disclosure, the common service entity determines whether the common service entity itself performs the task processing request based on at least one of its own computing capability, storage capacity, and security level.

According to embodiments of the present disclosure, the method further comprises: storing, by the common service entity, the task processing request in a request queue, wherein, said determining whether the common service entity itself performs the task processing request includes: determining that the common service entity itself performs the task processing request in a case where the number of requests comprised in the request queue is less than a first threshold; and determining that the common service entity itself does not perform the request in a case where the number of requests comprised in the request queue is more than or equal to the first threshold.

According to embodiments of the present disclosure, the task processing request comprises a certification request, and the method further comprises: determining whether the entity sending the certification request meets a second criterion; storing the information of the entity passing certification in a second resource list to update the second resource list; sending the updated second resource list to the common service entities in the first resource list; and sending a certification identifier to the entity passing the certification.

According to embodiments of the present disclosure, the method further comprises: removing information of an entity from the second resource list to update the second resource list; sending a notification message to the entity which is removed from the second resource list; and sending an updated second resource list to the common service entities in the first resource list.

According to embodiments of the present disclosure, the first criterion or the second criterion is determined based on at least one of computing capability, storage capacity, and security level.

According to embodiments of the present disclosure, the common service entity is configured to manage entities in the first resource list or the second resource list.

According to embodiments of the present disclosure, the task processing request further comprises at least one of a creation request, an update request, an acquisition request, a notification request, and a deletion request.

According to embodiments of the present disclosure, in the case where it is determined that the common service entity itself does not perform the processing, the method further comprises: receiving a response corresponding to the request from said another common service entity, receiving data corresponding to the request from the entity sending the request, and forwarding the data to said another common service entity, and sending processing results corresponding to the request received from said another service entity to the entity sending the request.

According to another aspect of the present disclosure, there is further provided a common service entity, comprising: a receiving unit configured to receive a task processing request; a processing unit configured to: determine whether the common service entity itself performs the task processing request; forward the request to another common service entity in a case where it is determined that the common service entity itself does not perform the task processing request; perform, by the common service entity, the task processing request in a case where it is determined that the common service entity itself performs the task processing request, wherein, the common service entity is associated with said another common service entity.

According to embodiments of the present disclosure, a first resource list is stored in the common service entity, and the first resource list contains information of all common service entities associated with the common service entity, the processing unit is further configured to determine whether other common service entities in the first resource list meet the first criterion, and remove a common service entity which does not meet the first criterion from the first resource list, so as to update the first resource list.

According to embodiments of the present disclosure, the common service entity determines whether the common service entity itself performs the task processing request based on at least one of its own computing capability, storage capacity, and security level.

According to embodiments of the present disclosure, the processing unit is further configured to store the received task processing request in a request queue, wherein, it is determined that the common service entity itself performs the task processing request in a case where the number of requests comprised in the request queue is less than a first threshold; it is determined that the common service entity itself does not perform the request in a case where the number of requests comprised in the request queue is more than or equal to the first threshold.

According to embodiments of the present disclosure, the task processing request comprises a certification request, the processing unit is further configured to determine whether an entity sending the certification request meets a second criterion, and store the information of the entity passing certification in a second resource list to update the second resource list; send the updated second resource list to the common service entities in the first resource list; and send a certification identifier to the entity passing the certification.

According to embodiments of the present disclosure, the processing unit is further configured to: remove information of an entity from the second resource list to update the second resource list; send a notification message to the entity which is removed from the second resource list; and send an updated second resource list to the common service entities in the first resource list.

According to embodiments of the present disclosure, the processing unit is further configured to: receive a response corresponding to the request from said another common service entity in the case where it is determined that the common service entity itself does not perform the processing; receive data corresponding to the request from the entity sending the request, and forward the data to said another common service entity; send processing results corresponding to the request received from said another service entity to the entity sending the request.

According to another aspect of the present disclosure, there is further provided an apparatus for task processing, comprising: one or more processors; one or more memories, in which computer readable codes are stored, the computer-readable codes causing, when executed by the one or more processors, the above discussed method for performing task processing on a common service entity to be performed According to another aspect of the present disclosure, there is further provided a computer storage medium, in which computer readable codes are stored, the computer-readable codes causing, when executed by the one or more processors, the above discussed method for performing task processing on a common service entity to be performed.

BRIEF DESCRIPTION OF THE DRAWINGS

In order to more clearly illustrate the technical solutions in the embodiments of the present disclosure or in the prior art, drawings necessary for describing the embodiments or the prior art will be briefly introduced below, obviously, the below described drawings are only some embodiments of the present disclosure, for those skilled in the art, other drawings may also be obtained based on these drawings without paying creative efforts.

DETAILED DESCRIPTION OF THE EMBODIMENTS

The technical solutions in the embodiments of the present disclosure will be described clearly and completely in conjunction with the drawings in the embodiments of the present disclosure. Obviously, the described embodiments are only a part of the embodiments of the present disclosure, but not all the embodiments. Based on the embodiments in the present disclosure, all other embodiments obtained by a person of ordinary skill in the art without creative labor shall fall within the protection scope of the present disclosure.

The terms "first", "second" and similar words used in this disclosure do not indicate any order, quantity or importance, but are only used to distinguish different components. Similarly, similar words such as "include" or "comprise" mean that the elements or objects appearing before the word cover the elements or objects listed after the word and their equivalents, but do not exclude other elements or objects. "Connected" or "coupled" and similar words are not limited to physical or mechanical connections, but may include electrical connections, whether direct or indirect.

A flowchart is used in the present application to illustrate the steps of the method according to the embodiments of the present application. It should be understood that the preceding or following steps are not necessarily performed accurately in order. Instead, the various steps can be processed in reverse order or simultaneously. At the same time, you can also add other operations to these processes, or remove a step or steps from these processes.

The IoT can be used as an extension of the Internet. It includes the Internet and all resources on the Internet and is compatible with all Internet applications. With the application of the IoT technology in various fields, various new application fields such as intelligent home, intelligent transportation, and intelligent health have emerged.

In the process of continuous development of various applications related to the IoT, and with the continuous deepening of IoT technology research and development and market promotion, the International Standardization Organization "oneM2M" in the field of IoT has been established, and the technical specifications and technical reports with respect to oneM2M have been generated, so as to promote the harmonization of international IoT standardization activities, reduce duplication of work, and ensure consistent IoT functions within various industries of the IoT.

In the oneM2M architecture, oneM2M entities need to have certain computing and storage capability. However, different oneM2M entities have differences in operation capability and so on. For example, among various oneM2M entities, the common service entity CSE may have a strong operation capability, while some application entities AE may have a weak operation capability. For example, in an intelligent home scenario, the operation capability of the gateway as a common service entity CSE may be stronger than the entity AE such as smart speaker, rice cooker, etc.

It should be noted that the entity described herein may be a terminal device of IoT, or may be a software module in the device.

Herein, as an example, an entity with a strong operation capability (such as CSE) may be represented as a strong entity, and an entity with a weak operation capability (such as AE) may be represented as a weak entity. The operation capability of the strong entity is stronger than that of the weak entity. For example, the operation capability of an entity can be estimated based on the entity's computing resources, network resources, storage resources, and security functions, thereby determining whether the entity belongs to a strong entity or a weak entity. For example, an entity with a storage space greater than 10M can be implemented as a strong entity, and the remaining entities with a storage capacity less than 10M can be implemented as weak entities. For example, the 800M CPU, which can support Internet Protocol Version 6 (IPV6), may be implemented as a strong entity, on which CSE functions can be efficiently executed, and may serve as a shared common service entity CSE for performing task processing operations of the weak entities connected thereto, such as resource operations, etc. The CSE functions refer to the functions performed by a CSE.

In the IoT, for the above-mentioned weak entities with weak operation capability, they may have certain operation capability to perform certain task processing in the oneM2M architecture, but may not have enough operation capability to realize complete operation of the oneM2M architecture. In other words, the weak entity does not have the function of realizing all resource management operations. In practical applications, if these weak entities are simply served as application entities AE, connected to a shared common service entity CSE and using the shared CSE to implement all related task processing, the weak entities' own capability will be wasted. However, if such weak entities execute all the CSE functions on their own, the implementation of the CSE functions will also be limited by their own operation capability, resulting in slowing down the overall work efficiency of the system. Security problems may be likely caused and running speed is also greatly affected. For example, a weak entity may not be able to complete operations on some sensitive data, or may has an extremely slow speed on generating its own key, which will affect the operation efficiency of the weak entity itself and in turn the operation efficiency of the entire system including the weak entity.

In order to solve the above-mentioned problem of the impact on operating speed and security of the OneM2M overall system due to the difference in their operation capability of the OneM2M entities, the present disclosure provides a method for task processing on a common service entity. The common service entity CSE may be implemented by the strong entity described above.

According to the embodiments of the present disclosure, a concept of centralized block is proposed. The centralized block may include a core block and a non-core block, the core block includes strong entities, and the non-core block includes weak entities. The strong entities in the core block can be managed by creating a first resource list, and the weak entities in the non-core block can be managed by creating a second resource list. The entities in the first resource list and the second resource list together form a centralized block. The centralized block may be a collection of entities within a certain range.

Figure 1A:
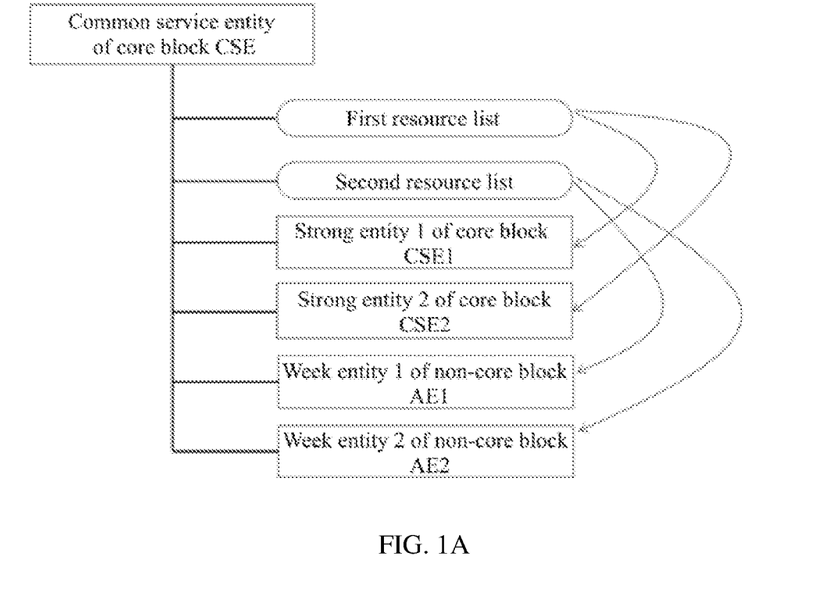
FIG. 1A illustrates a schematic diagram of a centralized block frame according to the embodiments of the present disclosure.

FIG. 1A illustrates a schematic diagram of a centralized block according to the embodiments of the present disclosure. The centralized block may include strong entities with strong operation capability and weak entities with weak operation capability. Among the centralized block, a common service entity can be used to implement management functions for all entities in the centralized block. The common service entity may be implemented by a strong entity with strong computing capability in the core block. Within a centralized block, several strong entities can be implemented as common service entities at the same time to realize the management function for all entities. It is also possible that only one strong entity is implemented as a common service entity. For example, in the case where only 3 (as an example) entities are included in the centralized block, one common service entity may implement the management function for the centralized block.

In the centralized block shown in FIG. 1A, a first resource list and a second resource list may be stored in a strong entity implemented as a common service entity CSE, and an association relationship among entities in the centralized block may be established through the lists. For example, the first resource list has information of all strong entities included in the core block of the centralized block, for example, strong entity 1 CSE1 and strong entity 2 CSE2 shown in FIG. 1A. Through the first resource list, the common service entity can realize the scheduling of the requests for task processing. For example, when the common service entity receives a request that it does not perform, it may forward the request to other strong entities (such as CSE1) in the first resource list to perform the request.

The second resource list has information of weak entities included in the non-core block of the centralized block, for example, weak entity 1 AE1 and weak entity 2 AE2 shown in FIG. 1A. Through the second resource list, the common service entity can realize the security management of the entities in the centralized block.

For example, entities such as gateway, smart speaker, electric light, and rice cooker may be included in the centralized block of the smart home circumstance, in which gateway and smart speaker with strong operation capability may serve as the members of core block, i.e., strong entities. The information of the gateway and the smart speaker may be stored in the first resource list to be associated with each other. Compared with the gateway and smart speaker, entities such as electric light and rice cooker in the smart home have weak operation capability, and cannot complete operations on some sensitive data, or have an extremely slow speed on generating their own keys, causing them being dependent on the gateway or other entities with strong operation capability for performing the task processing.

Weak entities such as light, rice cooker, etc. in the smart home circumstance may serve as non-core block members, and information of the weak entities may be stored in the second resource list.

The core block composed of the gateway and the smart speaker and the non-core block composed of the light and the rice cooker together constitute a centralized block of this smart home circumstance. In this centralized block, a strong entity in the core block may serve as a common service entity for the weak entity in the non-core block, and realize the task processing related to the weak entity. In addition, a strong entity in the core block can also implement management of other strong entities in the core block, such as security certification. Thus, in this centralized block, the entities in the core block can manage and schedule resources for all entities in the entire centralized block, thereby improving the overall operation efficiency of the centralized block.

Figure 1B:
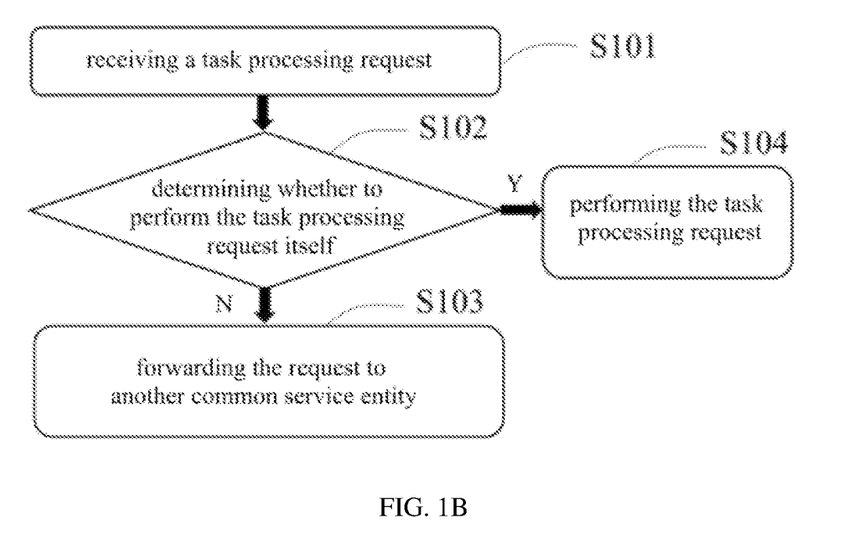
FIG. 1B illustrates a flowchart of a method for performing task processing on a common service entity according to the embodiments of the present disclosure.

On basis of the above centralized block according to the present disclosure, a method for performing task processing on a common service entity, which may be a strong entity within a core block, is proposed. FIG. 1B shows a flowchart of the method for performing task processing on a common service entity according to the embodiment of the present disclosure. The method for task processing according to the embodiments of the present disclosure will be described in detail below with reference to FIG. 1B.

As shown in FIG. 1B, in step S101, the common service entity receives a task processing request. The task processing request is a request to the common service entity for processing a task. For example, the task processing request may be a certification request, a creation request, an update request, an acquisition request, a notification request, a deletion request, and so on. The common service entity may be any strong entity in the core block, such as CSE1. The task processing request may be sent by a weak entity in the non-core block in the same centralized block as the strong entity. For example, in the smart home circumstance, when the weak entity needs to get a security certification, it may send a security certification request to the strong entity, which requests the strong entity to generate a certification key of the weak entity to obtain the access to obtain corresponding data in the centralized block of the smart home.

Next, in step S102, after receiving the task processing request, the common service entity CSE1 may determine whether performs the task processing request itself. For example, the common service entity CSE1 may determine whether to perform the task processing request itself based on its own computing capability, storage capacity, and security level. For example, in the centralized block of the smart home circumstance, when the gateway receives a certification request sent by a rice cooker as a weak entity, the gateway may be performing the task processing request from other weak entities. The gateway may estimate the operation capability required by the certification request, and determine whether to perform the certification request itself according to its current computing capability and storage capacity. For example, when the gateway determines that completing the certification request by itself may take a long time, which may affect the operation efficiency of the overall system. At this time, the gateway may determine that the certification request is not performed by itself. The relationship between the operation time and the operation efficiency can be set artificially, for example, the gateway can be set as follows, when the time for performing a certain task processing is more than 1 minute, it determines that it does not perform the task itself. This time setting is only exemplary, and can be adjusted according to the specific circumstance to which the concentrated block belongs.

If it is determined that the common service entity CSE1 does not perform the task processing request itself, then in step S103, the common service entity CSE1 forwards the request to another common service entity, such as CSE2. According to the embodiments of the present disclosure, the common service entity CSE1 is associated with the another common service entity CSE2. For example, a resource list may be stored in the common service entity CSE1 and used to determine other common service entities CSE associated with the common service entity CSE1.

For example, in the centralized block of the smart home circumstance, if a strong entity 1 in the core block receives a task processing request and determines not to perform the task processing based on its own current operation capability, the strong entity 1 can forward the task processing request to other strong entities in the core block, such as strong entity 2, to request the strong entity 2 to process the requested task. The information of the strong entity 1 and the strong entity 2 may be recorded together in the first resource list maintained by all the strong entities in the centralized block. For example, the strong entity 1 may determine other strong entities associated with it, such as the strong entity 2, by querying the first resource list, so as to forward the task request to the strong entity 2. Both the strong entity 1 and the strong entity 2 in the core block shown can be implemented as a common service entity CSE due to their strong operation capability.

If it is determined that the common service entity CSE1 performs the task processing request itself, for example, the common service entity CSE 1 determines that it can perform the task processing request, then in step S104, the common service entity CSE1 performs the task processing request. For example, the requested task processing is a resource operation, and the common service entity CSE1 determines that it is capable of performing the task processing request based on its remaining storage capacity and computing capability, and then performs the processing operations corresponding to the request without forwarding the task processing request to other common service entity, such as CSE2.

Thus, the present disclosure provides a method for managing the functions and task processing modes of entities based on the operation capability of the entities (including common service entities and application entities).

In the embodiments according to the present disclosure, multiple entities belonging to the same network may be divided into a centralized block, where the operation capabilities of the multiple entities are different. For example, the multiple entities may include one or more strong entities and one or more weak entities, etc. In the centralized block, a strong entity capable of executing all functions of the oneM2M architecture may serve as a member of the core block, for example, a common service entity CSE may serve as a core block entity. In addition, weak entities with weak operation capability can serve as the members of non-core block, for example, common AE can serve as an entity in the non-core block.

The core block may be implemented as group resources, for example, the information of the entities in the core block may be stored in, for example, a member ID sequence of a <group> resource, thereby establishing the association among the core block members. In addition, the entities within the core block can also establish associations among core block members in the form of resource indexes. For example, in the above smart home circumstance, gateway, smart speaker, light, rice cooker, etc. belonging to the same network constitute a centralized block. Within the centralized block, a strong entity with a strong operation capability that can operate as a common service entity is represented as a core block member, and other entities with an operation capability weaker than the strong entity are represented as non-core block members. The members in the core block are managed based on a first resource list, and the members in the non-core block are managed based on a second resource list. Each member in the core block is stored with the first resource list and the second resource list so as to receive the task processing request from the weak entities in the second resource list and forward the request to another strong entity in the first resource list when it is determined that it does not perform the task processing request itself.

Thus, according to the embodiments of the present disclosure, a strong entity in the centralized block can be used as a CSE to manage the task processing of the entire centralized block, and the core block and non-core block members cooperate with each other to improve the operation efficiency of the entire centralized block and ensure the stability and security within the centralized block.

Figure 2:
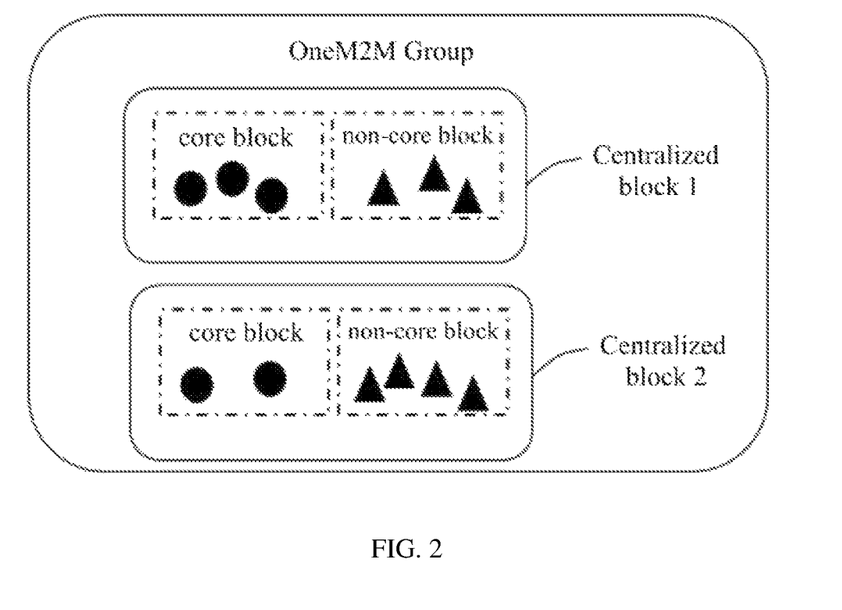
FIG. 2 illustrates a schematic diagram of a centralized block according to the embodiments of the present disclosure.

FIG. 2 illustrates a schematic diagram of a centralized block according to the embodiments of the present disclosure. As shown in FIG. 2, an OneM2M device group may include one or more centralized blocks, such as centralized block 1 and centralized block 2. In the centralized block, entities can be divided into core blocks members or non-core block members. According to the embodiments of the present disclosure, in the above centralized block, the common service entity CSE may serve as a core block member, and the weak entity may serve as a non-core block member. For example, the core block in the centralized block 1 may include 3 common service entities represented by circles in the dashed box on the left, while the non-core block may include 3 weak entities represented by triangles in the dashed box on the right.

Optionally, for other centralized blocks in the device group, for example, the number of entities in the core block and the number of entities the non-core block in the centralized block 2 may be the same as or different from those of the centralized block 1. As shown in FIG. 2, the core block in the centralized block 2 may include two common service entities represented by circles in the dashed box on the left, and the non-core block may include 4 weak entities represented by triangles in the dashed box on the right.

During the operation of the system, the weak entity in the centralized block may request the common service entity CSE in the core block to perform the corresponding task processing. For example, the task may include entity certification, entity certification, and the like.

According to the embodiments of the present disclosure, the management status of different common service entities in the core block are equal, and each common service entity can manage other common service entities in the same core block.

In the embodiments according to the present disclosure, a first resource list may be stored in a common service entity in the core block and contains information of all common service entities associated with the common service entity. For example, the first resource list stored in the common service entity CSE1 contains information of the common service entity CSE2. When the common service entity CSE1 receives a task processing request and determines that it does not temporarily perform the task processing request (for example, the common service entity CSE1 receives multiple processing requests in a short time, which exceed the task processing ability of its own, and request congestion will be caused if it performs all the requests itself), CSE1 can forward the task processing request to the common service entity CSE2. The information in the first resource list may contain the identity, operation capability, etc., of the common service entity and may also contain other information of the common service entity.

According to the embodiments of the present disclosure, the common service entity in the core block not only needs to have strong computing capability and storage capacity, but also needs to have a high security level. The information in the first resource list corresponds to the information of the common service entities included in the core block. After a period of operation, each common service entity in the resource list may update the information in the first resource list.

The common service entity may manage other entities in the first resource list. For example, the management may include periodically updating the information of the entities in the first resource list. In addition, the management may also include an addition operation, such as assigning a certification identifier to a new strong entity that has passed security verification, and adding the information of the new strong entity to the first resource list. The management may further include a removal operation, for example, information of a strong entity that does not meet the security level may be removed from the first resource list.

According to the embodiments of the present disclosure, a common service entity in the core block may determine whether other common service entities in the first resource list meet the first criterion, and remove the common service entity that does not meet the first criterion from the first resource list to update the first resource list. The first criterion is a criterion for estimating whether an entity has strong entity capability, and the first criterion may be determined based on at least one of the entity's computing capability, storage capacity, and security level. For example, the capability of an entity can be estimated based on aspects such as computing resources, network resources, storage resources, and security functions. As described above, an 800 M CPU with strong storage capacity can be implemented as a strong entity in a centralized block.

For example, the common service entity in the core block not only needs to have strong computing capability and storage capacity, but also needs to have a high security level. At regular intervals, each common service entity in the resource list may update the information in the first resource list, for example, information of a common service entity that does not meet the security standards of the core block entity is deleted from the first resource list. According to the embodiments of the present disclosure, the time interval may be set according to the security requirements of the centralized block. For example, if the core block has high security requirements for the strong entities therein, the time interval may be shortened. In addition, the time interval can also be set according to the business requirements of the managing party of the centralized block, and changes as the requirements change. No limitation is made on the time interval here in the present disclosure.

Figure 3A:
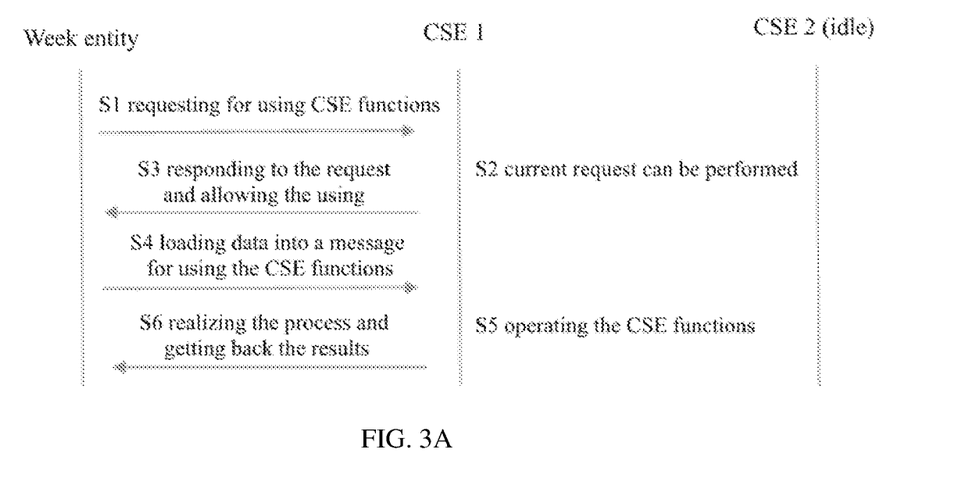
FIG. 3A and FIG. 3B illustrate flowcharts of a centralized block performing task processing according to the embodiments of the present disclosure.
Figure 3B:
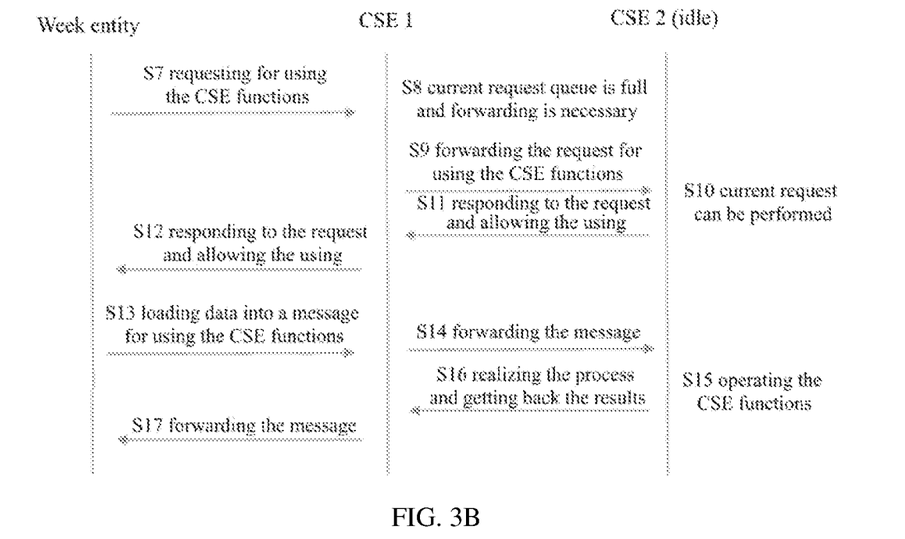

In the centralized block, the strong entity in the core block can manage all members, and can also provide the CSE functions requested by an entity in the non-core block. The entities in the core block and the non-core block cooperate with each other to jointly and efficiently realize the functions of the entire centralized block. Herein, FIG. 3A and FIG. 3B illustrate flowcharts of task processing of a centralized block according to the embodiments of the present disclosure.

In the following, a method for performing task processing on a common service entity according to the present disclosure and its embodiments will be described in detail in conjunction with FIG. 3A and FIG. 3B.

The strong entity in the core block can be implemented as a common service entity CSE1. When a certain task processing needs to be performed, CSE1 firstly determines whether to perform the task processing itself. For example, CSE1 may determine whether to perform the task processing based on its current condition. For example, CSE1 can determine whether to perform the task processing according to its own CPU occupancy rate, bandwidth occupancy rate, and free storage space. If CSE1 determines it is capable of performing the task processing itself, it directly executes the task processing. If CSE1 determines not to perform the task processing itself, it sends the task to another common service entity CSE2 belonging to the core block. For example, as shown in FIG. 3A, in step S1, the weak entity may send a task processing request to the common service entity CSE1. For example, the task processing request may be a request for utilizing the CSE functions. The request for utilizing the CSE functions may be a request sent by a weak entity to CSE1 to request CSE1 to perform corresponding data processing. The weak entity cannot perform the CSE functions itself due to the limitation of its own operation capability.

The CSE1 can determine whether to handle the task processing request itself. According to the embodiments of the present disclosure, after receiving a request issued by an entity in a non-core block for using the CSE functions, the common service entity CSE1 may store the received request in a request queue.

The CSE1 can automatically adjust the allocation of task processing, for example, it can determine whether to process the request itself based on the number of requests in the request queue. For example, when the number of requests included in the request queue is less than a first threshold, it is determined that it performs the task processing request; and when the number of requests included in the request queue is greater than or equal to the first threshold, it is determined that it does not performs the task processing request. For example, the first threshold may be set based on the requirements of the centralized block for task processing efficiency. For example, if the centralized block has a higher requirement for task processing efficiency, the first threshold is set with a smaller value.

For example, in the centralized block of the smart home circumstance, there is a high requirement for the efficiency of task processing related to the certification request. When a new entity needs to be added to this centralized block, it is preferred that a security certification will be quickly performed so as to realize the process of adding the new entity. At this time, the value of the first threshold may be set to 3 (as an example). That is, when a certification request is received by the gateway as CSE1, if the number of requests in its own request queue, which is 5 as an example, is determined to be greater than or equal to 3, the CSE1 determines that realizing the certification request will take a long time since 5 non-processed request in the request queue need to be handled before performing the certification request. In this case, the CSE1 may determine that it does not perform the certification request, and forwards the certification request to another common service entity CSE2 in the same core block as the CSE1, for example, smart speaker.

According to other embodiments of the present disclosure, the common service entity can also determine whether to perform a task processing request according to the content of the task processing request, for example, for a certification request, it will process it by itself, and for a data update request, it will forward the request to other common service entities. In these embodiments, the common service entity in the core block can perform operation management and allocation according to the content of the task processing request. For example, in the centralized block of the smart home circumstance, it may be set that the requests regarding certification, addition, etc. are performed by the gateway, and the requests regarding data processing, etc. are performed by the smart speaker. Therefore, after receiving a data update request sent by the rice cooker, the gateway may determine not to perform the request and forward the request to the smart speaker. Similarly, after receiving a certification request, the smart speaker may determine not to perform the request itself, and forward the request to the gateway.

In step S2, the CSE1 determines that it may process the currently received request. Then in step S3, the CSE1 may send a response to the request to the weak entity for allowing the weak entity using the CSE functions. After receiving a message of the response, in step S4, the weak entity can load the data into a message and use the CSE functions of CSE1. In step S5, the CSE1 performs the CSE functions operation corresponding to the request. Finally, in step S6, the CSE1 completes the processing and returns the processing results to the weak entity.

As shown in FIG. 3B, in step S7, the weak entity requests CSE1 to use the functions of CSE. Next, in step S8, the CSE1 may store the request in a message queue and determine the number of unprocessed requests in the message queue. For example, if the number of unprocessed requests exceeds the first threshold, the CSE1 confirms not to perform the request itself and forwards the request to another common service entity in the core block, for example, CSE2, so as to avoid the request congestion in CSE1.

In step S9, CSE1 may forward the request to CSE2. In addition, according to the embodiments of the present disclosure, the CSE1 may also determine the request to be forwarded based on the priorities of the requests in the request queue. For example, a request sent by an entity of a non-core block to the CSE has a priority attribute, for example, a Quality of Service (QOS) parameter, which is used to identify the priority of the request. At this time, the CSE1 can determine the order of processing each request according to the priorities of these requests. For example, when CSE1 determines that the number of requests in the request queue exceeds the first threshold, it may forward the request with a highest priority in the request queue to an idle CSE2, where, CSE1 and CSE2 belong to the same core block. For example, CSE1 may confirm the member CSE2 belonging to the same core block through the first resource list.

Next, in step S10, CSE2 determines that it can process the request, and in step S11, CSE2 responds to CSE1 to allow the request for using the CSE functions. In step S12, CSE1 may send the information that CSE2 allows the use of the CSE functions to the weak entity as the requesting party. In step S13, the weak entity loads data into a message for using the CSE functions. In step S14, CSE1 forwards the data to CSE2 after receiving it. Next, in step S15, CSE2 allows the weak entity to use its CSE functions to perform CSE functions operations, and sends the processing result to CSE1 in step S16. Then, in step S17, the CSE1 forwards the processing results to the weak entity as the requesting party.

According to the above description in conjunction with FIG. 3A and FIG. 3B, the operation process of the task processing method proposed by the present disclosure can be understood. Wherein, a centralized block includes a core block and a non-core block. The core block may include strong entities with strong processing capability, and the strong entities may be implemented as common service entities to provide CSE functions to other entities. The non-core block may include weak entities with weaker processing capability. The entities in the core block can manage all entities in the centralized block and process task requests that cannot be processed by weak entities in the non-core block or requests that are time-consuming for the weak entities. The core block and the non-core block cooperate with each other to realize the tasks in the centralized block, and the task scheduling of the request is automatically performed as shown in FIG. 3B above, so that the task requirements of the entire centralized block will not be accumulated, thereby increasing the processing power and efficiency of the centralized block.

For entities in the oneM2M architecture, each communication between the initiator and the receiver require registering the corresponding resources and the declared version of the OneM2M resource on both sides, and then data submission can be achieved by changing these resources locally and synchronizing the change to remote declared resource version. Therefore, during the message delivery process, an identity certification process (which may also comprise data encryption and decryption process) is first performed.

Figure 4:
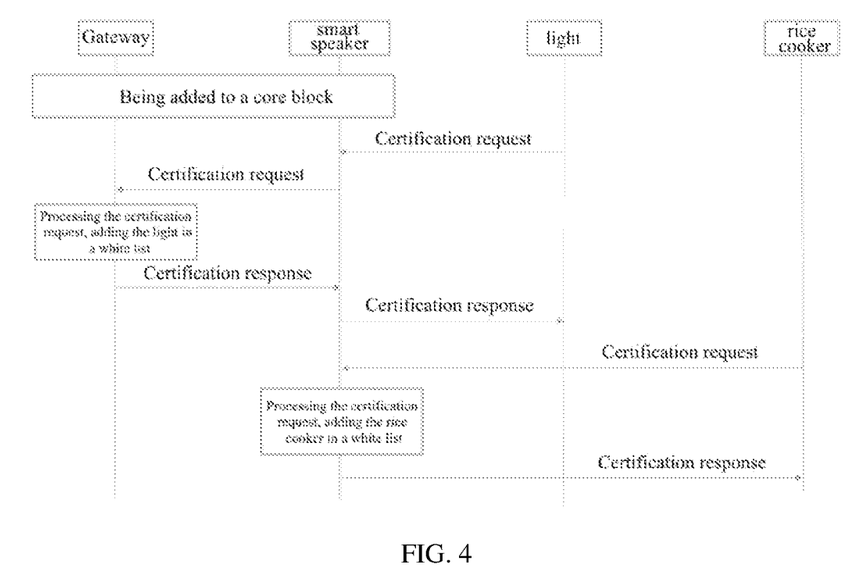
FIG. 4 illustrates a flowchart of performing a certification request according to the embodiments of the present disclosure.

In the embodiments according to the present disclosure, the task processing request may further include a certification request, that is, an entity in the non-core block sends a certification request to the common service entity in the core block to obtain a certification identifier, through which the entity can communicate with other entities in the centralized block without being certificated again. FIG. 4 illustrates a flowchart of performing a certification request according to the embodiments of the present disclosure.

As shown in FIG. 4, in the centralized block taking the smart home circumstance as an example, the entities in the core block may include a gateway and a smart speaker, and the entities in the non-core block may include a light and a rice cooker. For example, the rice cooker may send a certification request to the smart speaker, and the smart speaker determines that the certification request of the rice cooker can be performed by itself based on its own computing capability, and then directly processes the certification request. Then, the smart speaker determines whether the entity sending the certification request, that is, the rice cooker, meets a second criterion. If it meets, it can be considered that the rice cooker has passed the safety certification, and the information of the certified rice cooker is stored in a second resource list to update the second resource list. The second resource list may also be referred to as a white list, in which information about entities that have passed security certification in the non-core block is stored. Then, the smart speaker may send the updated second resource list to other common service entities in the first resource list, and send the certification identifier to the rice cooker. The rice cooker can communicate with other entities in the centralized block according to the certification identifier. Specifically, a "token resource" can be created in the rice cooker to identify that it has passed the certification, which means that it meets the security standards.

The second criterion serves as a criterion for estimating whether the entity is safe, and the common service entity may determine the second criterion based on the security level of the weak entities. According to another embodiment of the present disclosure, the second resource list may have information of all certificated entities in the centralized block, that is, it may include information of both strong entities in the core block and weak entities in the non-core block. By this way, a strong entity served as a common service entity can manage all security entities in the centralized block through the second resource list. According to some embodiments of the present disclosure, the information of the entities in the core block may be stored in the second resource list by default. In other words, in the centralized block of the smart home, it is default that the strong entities in the core block associated with the first resource list comply with the security certification standard (such as the second criterion) of the second resource list.

In addition, as shown in FIG. 4, after the light as an entity in a non-core block sends the certification request to the smart speaker, the smart speaker determines that it does not perform the certification request based on its insufficient computing space. Then, the smart speaker may forward the certification request to the gateway belonging to the same core block as the smart speaker. Or, according to another embodiment of the present disclosure, the smart speaker may also selectively forward a request with higher priority in its request queue to the gateway for processing.

Then, the gateway may process the certification request. And, the gateway adds the information of the light to the second resource list if it is determined that the light meets the second criterion. The smart speaker forwards a certification identifier to the light to indicate that it has passed the certification.

According to the embodiments of the present disclosure, the smart speaker or gateway may determine the second criterion based on at least one of computing capability, storage capacity, and security level. For example, for a certification request, the smart speaker or gateway may evaluate the security levels of non-core entities, and sends a certification identifier only to an entity that meets the security standard to maintain the overall security of the system.

According to the embodiments of the present disclosure, the common service entity in the core block can also manage entities in the second resource list.

For example, as shown in FIG. 4, after the smart speaker sends the certification identifier to the rice cooker and stores the information of the rice cooker in the second resource list, the information of the rice cooker may also be periodically removed from the second resource list to update the second resource list. For example, after a period of time, the smart speaker will verify again whether the rice cooker meets the second criterion, and removes the information of the rice cooker from the second resource list if it does not meet the criterion. Then, the smart speaker may send a notification message to the entity that is removed from the second resource list, that is, the rice cooker, and send the updated second resource list to the common service entities in the first resource list. For example, in a centralized block of a smart home, a smart speaker as a common service entity may implement periodic update processing of information in the second resource list. The weak entity obtains the security certification by sending a certification request to the smart speaker, and has a token resource for communicating with other entities. After 10 days (for exemplary purposes only), the smart speaker can automatically remove the information of the week entity from the second resource list, and release the validity of the token resource.

According to the embodiments of the present disclosure, the entity within the non-core block may receive a notification message of removing its information from the second resource list from the smart speaker. After receiving the notification message, the rice cooker may send a certification request to the common service entity in the first resource list to re-acquire the certification identifier.

In this case, the weak entity needs to send a security certification request to the smart speaker again. If the smart speaker determines that the weak entity does not meet the second criterion at this time, it does not pass the certification request of the entity. In this way, the security management function in the centralized block can be implemented to prevent the leakage of sensitive data, thereby ensuring the security and stability of the entire centralized block.

In addition, the common service entity in the core block may also change the second criterion according to the changes in management requirements of the centralized block.

Using the above centralized block-based task processing method proposed by the present disclosure, the efficiency of the system operation are effectively improved by the cooperation between the core block and the non-core block, thus fully using the weak entities' own operation capability meanwhile utilizing strong entities to realize the tasks that cannot be realized by the weak entities or being time consuming for them (such as the operation of sensitive data or the generation of weak entity's own key which may cause the weak entity spending extremely long time, etc.). The common service entities in the core block can also cooperate with each other to automatically perform task scheduling, thus effectively avoiding problems such as task request blocking. In this way, the individual's operation speed and the overall system's operation efficiency are greatly improved.

Figure 5:
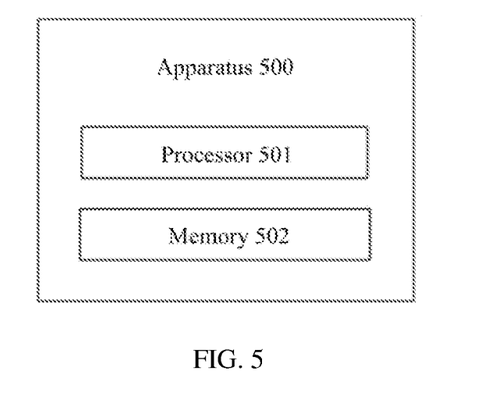
FIG. 5 illustrates a schematic diagram of an apparatus for performing task processing according to the embodiments of the present disclosure.

FIG. 5 shows a schematic diagram of an apparatus for performing task processing according to the embodiments of the present disclosure. The device 500 may include one or more processors 501 and one or more memories 502. Computer readable codes are stored in the processors 501. When the computer-readable codes are executed by the one or more processors, the method for task processing on the common service entity as described above can be carried out, which will not be repeated here.

Figure 6:
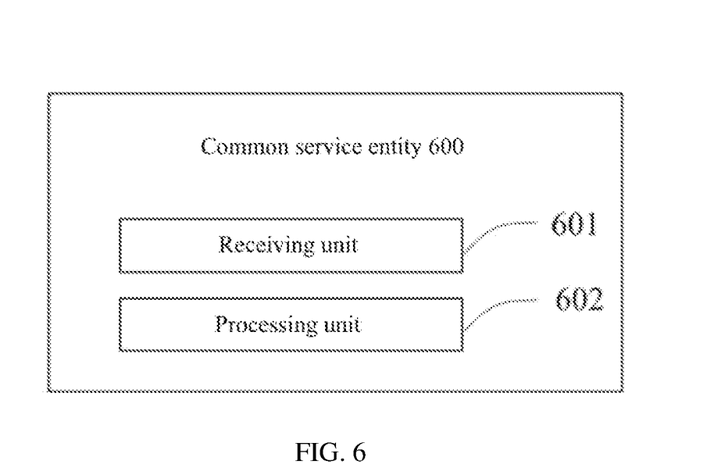
FIG. 6 illustrates a schematic block diagram of a common service entity according to the embodiments of the present disclosure.

According to another aspect of the present disclosure, a common service entity is also provided. FIG. 6 shows a schematic block diagram of a common service entity 600 according to the embodiments of the present disclosure.

As shown in FIG. 6, the common service entity may include a receiving unit 601 and a processing unit 602. The receiving unit 601 may be configured to receive a task processing request. The processing unit 602 may be configured to determine whether the common service entity itself performs the task processing request; forward the request to another common service entity in a case where it is determined that the common service entity itself does not perform the task processing request; or perform the task processing request in a case where it is determined that the common service entity itself performs the task processing request. Wherein, the common service entity is associated with another common service entity. For example, the association relationship between the common service entity and another common service entity may be established through a resource list.

According to the embodiments of the present disclosure, a first resource list is stored in the common service entity 600, and the first resource list contains information of all common service entities associated with the common service entity. The processing unit 602 may also be configured to determine whether other common service entities in the first resource list meet the first criterion, and remove a common service entity that does not meet the first criterion from the first resource list, so as to update the first resource list.

According to the embodiments of the present disclosure, the common service entity 600 determines whether to perform the task processing request itself based on at least one of its own computing capability, storage capacity, and security level. For example, in the centralized block of the smart home circumstance, when the gateway receives a certification request sent by a rice cooker as a weak entity, the gateway may be processing task processing request of other weak entities, or the gateway may estimate the operation capability required for the certification request and determine whether to perform the certification request itself according to its current computing capability and storage capacity.

According to the embodiments of the present disclosure, the processing unit 602 may be further configured to store the received task processing request in a request queue; it is determined that the common service entity itself performs the task processing request in a case where the number of requests comprised in the request queue is less than a first threshold; or it is determined that the common service entity itself does not perform the request in a case where the number of requests comprised in the request queue is more than or equal to the first threshold. For example, as described above, the first threshold may be set based on the requirements of the centralized block for task processing efficiency, which will not be repeated here.

According to the embodiments of the present disclosure, the task processing request may comprise a certification request. In the case that the task processing request is a certification request, the processing unit 602 may be further configured to determine whether an entity sending the certification request meets a second criterion, store the information of the entity passing the certification in the second resource list so as to update the second resource list; send the updated second resource list to the common service entities in the first resource list; and send a certification identifier to the entity in the second resource list.

According to the embodiments of the present disclosure, the processing unit 602 may also be configured to remove information of an entity from the second resource list to update the second resource list; send a notification message to the entity removed from the second resource list; and send an updated second resource list to the common service entities in the first resource list.

As described above, the strong entities in the core block can be managed by creating a first resource list, and the weak entities in the non-core block can be managed by creating a second resource list. The entities in the first resource list and second resource list together form a centralized block. The centralized block is a collection of entities within a certain range.

According to the embodiments of the present disclosure, in the case where it is determined that the common service entity itself does not perform the processing, the processing unit 602 may be further configured to: receive a response corresponding to the request from another common service entity; receive data corresponding to the request from a requesting party and forward the data to said another common service entity; and send processing results corresponding to the request received from said another service entity to the requesting party. Using the above-mentioned common service entity proposed in the present disclosure, a centralized block-based task processing method can be realized, and the operation efficiency in the centralized block can be effectively improved through the cooperation between the core block and the non-core block, and the operational capability of the weak entity can be fully utilized. At the same time, a strong entity such as a common service entity is used to implement tasks that cannot be achieved by the weak entity or being time consuming for the weak entity (such as the operation of sensitive data or the generation of the weak entity's own keys which may cause the weak entity spending extremely long time, etc.). The common service entities in the core block can also cooperate with each other to automatically perform task scheduling, effectively avoiding problems such as task request blocking. In this way, the individual's operation speed and the overall system's operation efficiency are greatly improved.

According to the embodiments of the present disclosure, a computer storage medium is also provided. Wherein, computer readable codes are stored in the computer storage medium, which when executed by one or more processors can perform the method for performing task processing on a common service entity as described above, and the method will not be repeated here.

The present disclosure provides a method for managing a large-scale oneM2M architecture in a centralized block manner. The centralized block may include a core block and a non-core block, the core block may include strong entities with strong computing capability, and the strong entities may be implemented as common service entities for performing task requests of other entities. The non-core block includes weak entities with weaker operation capability. A method for task processing on a common service entity is proposed. The method includes: receiving, by the common service entity, a task processing request from an entity in the non-core block; determining whether the common service entity itself performs the task processing request; forwarding the request to another common service entity associated with the common service entity if it is determined that the common service entity itself does not perform the task processing request; performing, by the common service entity, the task processing request in a case where it is determined that the common service entity itself performs the task processing request.

The common service entity may perform the task processing method as described above. The entities of the core block and the non-core block cooperate with each other to efficiently perform task management in the entire centralized block. Wherein, the core block may include strong entities with strong computing capability, and the strong entities may be implemented as common service entities to provide CSE functions to other entities. The non-core block may include weak entities with weaker processing capability. The operation capability of a strong entity is stronger than that of a weak entity.

The weak entity in the non-core block may send a task request to a strong entity implemented as a common service entity in the core block, and use the strong processing capability of the common service entity to perform the tasks that the weak entity itself cannot perform, such as the tasks going beyond the computing capability of the entity or taking a long time to realize. After receiving the task processing request, the common service entity may also determine whether to execute the processing corresponding to the request based on its current capability. To avoid request congestion or optimize the task processing flow, the common service entity may forward the received request to another idle common service entity in the core block to implement task scheduling among core block members. In addition, core block members can also manage the entities in the entire centralized block. For example, a certification identifier can be sent to an entity in the non-core block to improve the security level of the centralized block. The above task processing method according to the present disclosure can greatly improve the operation efficiency of the overall system and the operation speed of each entity.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

The above is illustration of the present disclosure and should not be construed as making limitation thereto. Although some exemplary embodiments of the present disclosure have been described, a person skilled in the art can easily understand that many modifications may be made to these exemplary embodiments without departing from the creative teaching and advantages of the present disclosure. Therefore, all such modifications are intended to be included within the scope of the present disclosure as defined by the appended claims. As will be appreciated, the above is to explain the present disclosure, it should not be constructed as limited to the specific embodiments disclosed, and modifications to the present disclosure and other embodiments are included in the scope of the attached claims. The present disclosure is defined by the claims and their equivalents.

The present application claims the benefit of priority on Chinese patent application with the application No. 201811022263.7, filed on Sep. 4, 2018 in China. For all purposes, the entire disclosure of the aforementioned application is incorporated herein by reference as a part of the disclosure of this application.

What is claimed is:

1. A method for performing task processing on a common service entity, the common service entity being a strong entity within a core block in an centralized block, the method comprising the following steps performed by the common service entity:
   receiving a task processing request sent by a weak entity in a non-core block in the same centralized block as the strong entity;
   determining whether the common service entity itself performs the task processing request;
   forwarding the request to another common service entity which is a strong entity within another core block in the same centralized block, in a case where it is determined that the common service entity itself does not perform the task processing request, wherein the common service entity is associated with said another common service entity;
   performing, by the common service entity, the task processing request in a case where it is determined that the common service entity itself performs the task processing request, wherein a first resource list is stored in the common service entity, and the first resource list contains information of all common service entities associated with the common service entity.

2. The method according to claim 1, wherein the common service entity determines whether other common service entities in the first resource list meet the first criterion, and removes a common service entity which does not meet the first criterion from the first resource list, so as to update the first resource list.

3. The method according to claim 1, wherein the common service entity determines whether the common service entity itself performs the task processing request based on at least one of its own computing capability, storage capacity, and security level.

4. The method according to claim 1, further comprising: storing, by the common service entity, the task processing request in a request queue, wherein, said determining whether the common service entity itself performs the task processing request includes:
  determining that the common service entity itself performs the task processing request in a case where the number of requests comprised in the request queue is less than a first threshold;
  determining that the common service entity itself does not perform the request in a case where the number of requests comprised in the request queue is more than or equal to the first threshold.

5. The method of claim 1, wherein the task processing request comprises a certification request, and the method further comprises: determining whether the entity sending the certification request meets a second criterion; storing the information of the entity passing certification in a second resource list to update the second resource list; sending the updated second resource list to the common service entities in the first resource list; sending a certification identifier to the entity passing the certification.

6. The method of claim 5, further comprising:
  removing information of an entity from the second resource list to update the second resource list;
  sending a notification message to the entity which is removed from the second resource list; and
  sending an updated second resource list to the common service entities in the first resource list.

7. The method according to claim 2, wherein the first criterion or the second criterion is determined based on at least one of computing capability, storage capacity, and security level.

8. The method according to claim 1, wherein the common service entity is configured to manage entities in the first resource list or the second resource list.

9. The method of claim 5, wherein the task processing request further comprises at least one of a creation request, an update request, an acquisition request, a notification request, and a deletion request.

10. The method according to claim 1, wherein, in the case where it is determined that the common service entity itself does not perform the processing, the method further comprises:
  receiving a response corresponding to the request from said another common service entity,
  receiving data corresponding to the request from the entity sending the request, and forwarding the data to said another common service entity,
  sending processing results corresponding to the request received from said another service entity to the entity sending the request.

11. A common service entity which is a strong entity within a core block in an centralized block, the common service entity comprising:
  a receiver configured to receive a task processing request sent by a weak entity in a non-core block in the same centralized block as the strong entity;
  a processor configured to:
  determine whether the common service entity itself performs the task processing request:
  forward the request to another common service entity which is a strong entity within another core block in the same centralized block in a case where it is determined that the common service entity itself does not perform the task processing request;
  perform, by the common service entity, the task processing request in a case where it is determined that the common service entity itself performs the task processing request,
  wherein, the common service entity is associated with said another common service entity,
  wherein a first resource list is stored in the common service entity, and the first resource list contains information of all common service entities associated with the common service entity.

12. The common service entity according to claim 11, the processor is further configured to determine whether other common service entities in the first resource list meet the first criterion, and remove a common service entity which does not meet the first criterion from the first resource list, so as to update the first resource list.

13. The common service entity according to claim 11, wherein the common service entity determines whether the common service entity itself performs the task processing request based on at least one of its own computing capability, storage capacity, and security level.

14. The common service entity according to claim 11, the processor is further configured to store the received task processing request in a request queue, wherein,
  it is determined that the common service entity itself performs the task processing request in a case where the number of requests comprised in the request queue is less than a first threshold;
  it is determined that the common service entity itself does not perform the request in a case where the number of requests comprised in the request queue is more than or equal to the first threshold.

15. The common service entity according to claim 11, wherein the task processing request comprises a certification request,
  the processor is further configured to determine whether an entity sending the certification request meets a second criterion, and store the information of the entity passing certification in a second resource list to update the second resource list;
  send the updated second resource list to the common service entities in the first resource list; and
  send a certification identifier to the entity passing the certification.

16. The common service entity according to claim 15, wherein the processor is further configured to:
  remove information of an entity from the second resource list to update the second resource list;
  send a notification message to the entity which is removed from the second resource list; and
  send an updated second resource list to the common service entities in the first resource list.

17. The common service entity according to claim 11, wherein the processor is further configured to:
  receive a response corresponding to the request from said another common service entity in the case where it is determined that the common service entity itself does not perform the processing;

receive data corresponding to the request from the entity sending the request, and forward the data to said another common service entity;

send processing results corresponding to the request received from said another service entity to the entity sending the request.

18. An apparatus for task processing, comprising:

one or more processors;

one or more memories, in which computer readable codes are stored, the computer-readable codes causing, when executed by the one or more processors, a method for performing task processing on a common service entity to be performed, the method comprising:

receiving a task processing request sent by a weak entity in a non-core block in a same centralized block as the strong entity, wherein the common service entity is a strong entity within a core block in the centralized block;

determining whether the common service entity itself performs the task processing request;

forwarding the request to another common service entity which is a strong entity within another core block in the same centralized block, in a case where it is determined that the common service entity itself does not perform the task processing request, wherein the common service entity is associated with said another common service entity;

performing, by the common service entity, the task processing request in a case where it is determined that the common service entity itself performs the task processing request, wherein a first resource list is stored in the common service entity, and the first resource list contains information of all common service entities associated with the common service entity.

19. A non-transitory computer storage medium, in which computer readable codes are stored, the computer-readable codes causing, when executed by the one or more processors, the method of claim 1 to be performed.

* * * * *